No. 679,328.  
J. T. NICHOLSON.  
SHAFT COUPLING.  
(Application filed Jan. 24, 1901.)  
Patented July 30, 1901.

(No Model.)

WITNESSES  
J. Smgg Poole  
Walter Allen

INVENTOR  
Jesmond T. Nicholson  
by Herbert W. T. Jenner.  
Attorney

THE NORRIS PETERS CO., PHOTO-LITHO., WASHINGTON, D. C.

UNITED STATES PATENT OFFICE.

JESMOND T. NICHOLSON, OF WILKESBARRE, PENNSYLVANIA.

SHAFT-COUPLING.

SPECIFICATION forming part of Letters Patent No. 679,328, dated July 30, 1901.

Application filed January 24, 1901. Serial No. 44,559. (No model.)

*To all whom it may concern:*

Be it known that I, JESMOND T. NICHOLSON, a citizen of the United States, residing at Wilkesbarre, in the county of Luzerne and State of Pennsylvania, have invented certain new and useful Improvements in Shaft-Couplings; and I do hereby declare the following to be a full, clear, and exact description of the invention, such as will enable others skilled in the art to which it appertains to make and use the same.

This invention relates to shaft-couplings; and it consists in the novel construction and combination of the parts hereinafter fully described and claimed.

Figure 1:
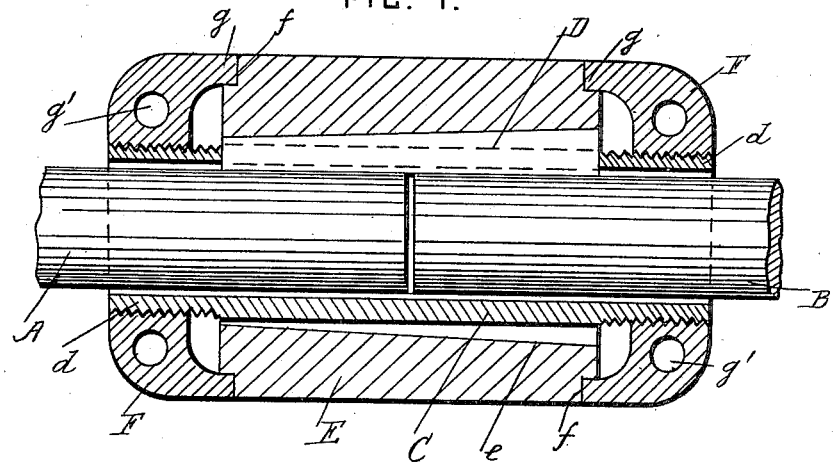
Figure 2:
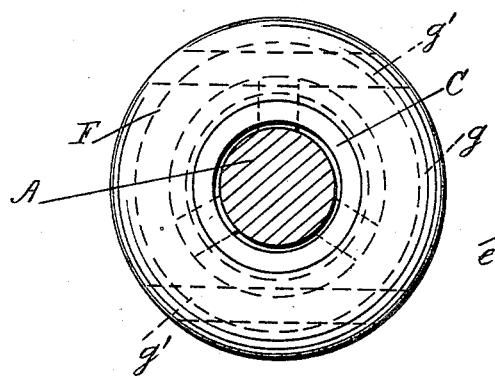
Figure 3:
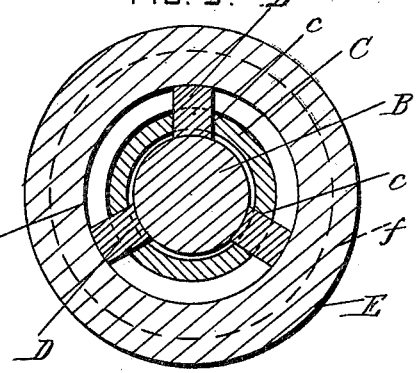
Figure 4:
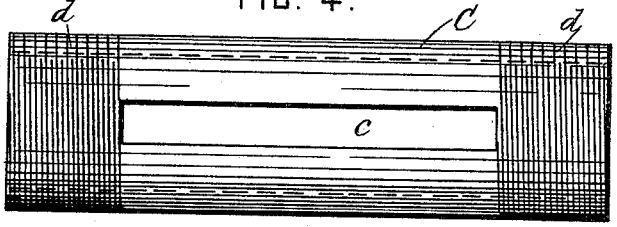

In the drawings, Figure 1 is a longitudinal section through the coupling. Fig. 2 is an end view. Fig. 3 is a cross-section through the coupling. Fig. 4 is a detail view of the cylindrical sleeve.

A and B are the end portions of two shafts which are to be coupled together.

C is a cylindrical inner sleeve provided with a series of longitudinal and parallel slots $c$, three or more slots $c$ being provided. The end portions $d$ of the sleeve are screw-threaded.

D represents tapered keys which are dropped into the slots $c$. The keys fit the slots closely, so that they can only move radially.

E is an outer sleeve, which has a conical hole or bore $e$ corresponding to the taper of the keys D and bearing against them. The sleeve E is cylindrical externally and has circular recesses $f$ in its ends.

F represents circular nuts which are screwed on the screw-threaded end portions $d$ of the inner sleeve. The nuts are provided with projecting rings $g$, which engage with the recesses $f$ in the outer sleeve, thereby reinforcing it and centering the inner sleeve, and $g'$ represents holes in the nuts for a rod or key which is used to adjust them.

The parts of the couplings are placed over the end portions of the shafts, as shown, and the keys are pressed against the shafts by means of one of the nuts and the conical sleeve. The other nut is used as a jam-nut and also for the purpose of freeing the shafts from the pressure of the keys by moving the conical sleeve in the reverse direction to that in which it is moved when the shafts are coupled together.

What I claim is—

1. In a shaft-coupling, the combination, with an inner sleeve provided with screw-threaded end portions and a series of longitudinal and parallel slots; of tapered keys arranged in the said slots, a tapered outer sleeve which bears against the said keys, and nuts arranged on the end portions of the inner sleeve and engaging with the outer sleeve, substantially as set forth.

2. In a shaft-coupling, the combination, with an inner sleeve provided with screw-threaded end portions and a series of longitudinal and parallel slots; of tapered keys arranged in the said slots, a tapered outer sleeve which bears against the said keys and has circular recesses in its ends, and nuts arranged on the end portions of the inner sleeve and provided with laterally-projecting rings which engage with the said recesses of the outer sleeve, substantially as set forth.

In testimony whereof I affix my signature in presence of two witnesses.

JESMOND T. NICHOLSON.

Witnesses:
A. J. WINDER,
JOHN I. LABAGH.